United States Patent
Chang et al.

(10) Patent No.: US 11,851,847 B2
(45) Date of Patent: Dec. 26, 2023

(54) LOCALIZED NAVIGATION SYSTEM CONTROLLER FOR POWER MACHINE

(71) Applicant: Clark Equipment Company, West Fargo, ND (US)

(72) Inventors: Yizhe Chang, Claremont, CA (US); Robert J. Gonzalez, Margate, FL (US); Jingnan Shi, Shanghai (CN); Sirapatsorn Pongpiriyakarn, Bangkok (TH); Felipe Borja, Falls Church, VA (US); Chi-Yen Lee, New Taipei (TW); Maxwell Maleno, Manhasset, NY (US)

(73) Assignee: DOOSAN BOBCAT NORTH AMERICA INC., West Fargo, ND (US)

( * ) Notice: Subject to any disclaimer, the term of this patent is extended or adjusted under 35 U.S.C. 154(b) by 39 days.

(21) Appl. No.: 17/609,574

(22) PCT Filed: May 6, 2020

(86) PCT No.: PCT/US2020/031644
§ 371 (c)(1),
(2) Date: Nov. 8, 2021

(87) PCT Pub. No.: WO2020/227387
PCT Pub. Date: Nov. 12, 2020

(65) Prior Publication Data
US 2022/0228347 A1   Jul. 21, 2022

Related U.S. Application Data

(60) Provisional application No. 62/844,494, filed on May 7, 2019.

(51) Int. Cl.
*E02F 9/20* (2006.01)
*E02F 9/26* (2006.01)
*G05D 1/02* (2020.01)

(52) U.S. Cl.
CPC .............. *E02F 9/205* (2013.01); *E02F 9/261* (2013.01); *G05D 1/0276* (2013.01); *G05D 2201/0202* (2013.01)

(58) Field of Classification Search
CPC .......... E02F 9/205; E02F 9/261; E02F 9/262; G05D 1/0276; G05D 2201/0202
See application file for complete search history.

(56) References Cited

U.S. PATENT DOCUMENTS

| 5,359,517 A | 10/1994 | Moriya et al. |
| 5,612,883 A | 3/1997 | Shaffer et al. |

(Continued)

FOREIGN PATENT DOCUMENTS

| CN | 1262716 A | 8/2000 |
| CN | 104179116 A | 12/2014 |

(Continued)

OTHER PUBLICATIONS

Notification of Transmittal of the International Search Report and Written Opinion of the International Searching Authority for PCT/US2020/031644, dated Sep. 21, 2020.

(Continued)

*Primary Examiner* — Rodney A Butler
(74) *Attorney, Agent, or Firm* — John Veldhuis-Kroeze; Westman, Champlin & Koehler, P.A.

(57) ABSTRACT

Disclosed are power machines and systems configured to provide autonomous or augmented control of the machines in a localized positioning environment in which GPS navigation is not available. Also disclosed are methods of providing augmented control of a power machine in such an environment.

14 Claims, 8 Drawing Sheets

(56) References Cited

U.S. PATENT DOCUMENTS

| | | |
|---|---|---|
| 6,523,765 B1 | 2/2003 | Kurenuma et al. |
| 6,732,458 B2 | 5/2004 | Kurenuma et al. |
| 6,778,097 B1 | 8/2004 | Kajita et al. |
| 8,315,789 B2 | 11/2012 | Dunbabin et al. |
| 9,096,977 B2 | 8/2015 | Fritz et al. |
| 9,359,729 B2 | 6/2016 | Fritz et al. |
| 9,561,941 B1 | 2/2017 | Watts |
| 9,970,164 B2 | 5/2018 | Fritz et al. |
| 2003/0019132 A1 | 1/2003 | Kurenuma et al. |
| 2009/0108562 A1 | 4/2009 | Hagenbuch |
| 2010/0223008 A1 | 9/2010 | Dunbabin et al. |
| 2013/0006484 A1 | 1/2013 | Avitzur et al. |
| 2014/0324291 A1 | 10/2014 | Jones et al. |
| 2014/0348584 A1 | 11/2014 | Fritz et al. |
| 2015/0045992 A1 | 2/2015 | Ashby et al. |
| 2016/0002878 A1 | 1/2016 | Harper |
| 2016/0053447 A1 | 2/2016 | Fritz et al. |
| 2016/0091606 A1* | 3/2016 | Shin .................. G01S 15/08 367/99 |
| 2016/0207637 A1* | 7/2016 | Campillo ............. G05D 1/0011 |
| 2017/0089020 A1 | 3/2017 | Fritz et al. |
| 2019/0025854 A1* | 1/2019 | Rohani ................ G01C 21/005 |
| 2019/0129384 A1* | 5/2019 | Cherney ................ G06F 3/017 |
| 2020/0182645 A1* | 6/2020 | Henn ................... G01C 21/367 |

FOREIGN PATENT DOCUMENTS

| | | |
|---|---|---|
| CN | 105317071 A | 2/2016 |
| JP | H10212740 A | 8/1998 |
| JP | 2016089389 A | 5/2016 |
| SE | 0300001 | 1/2003 |
| WO | 2015121818 A2 | 8/2015 |

OTHER PUBLICATIONS

First Office Action, including Search Report, for Chinese Patent Application No. 202080034009.8, dated Jan. 10, 2023, 21 pages.

* cited by examiner

| Algorithm 2 A* Path Finding |
|---|
| 1: function UPDATE_PLAN |
| 2:     initialize priority queue (based on total cost) with current location as starting point |
| 3:     while queue not empty do |
| 4:         if destination reached then |
| 5:             break |
| 6:         end if |
| 7:         for every neighbor nodes do |
| 8:             calculate new travel cost of neighbor node |
| 9:             if first time calculation or new cost less than old cost then |
| 10:                 update travel cost of neighbor node |
| 11:                 calculate total cost of neighbor node (travel + heuristic) |
| 12:                 put neighbor node and its total cost in queue |
| 13:                 set current node as parent of neighbor node |
| 14:             end if |
| 15:         end for |
| 16:     end while |
| 17:     if never reach destination then |
| 18:         no path found, stay in place |
| 19:     else |
| 20:         generate path |
| 21:         publish path |
| 22:     end if |
| 23: end function |

| Algorithm 3 A* Path Generating |
|---|
| 1: procedure GENERATE_PATH |
| 2:     initialize empty list for path |
| 3:     set current node to be the destination |
| 4:     while current node not starting node do |
| 5:         add current node to path |
| 6:         update current node to be its parent node |
| 7:     end while |
| 8:     reverse path |
| 9: end procedure |

| Algorithm 4 Target Updating |
|---|
| 1: procedure UPDATE_CURRENT_TARGET |
| 2:     calculate current position on the map |
| 3:     if distance from current position to current target too far then |
| 4:         replan the path |
| 5:     else if distance too close then |
| 6:         if final target (destination) not reached then |
| 7:             update current target to be the next target in the path |
| 8:         end if |
| 9:     end if |
| 10: end procedure |

FIG. 8

LOCALIZED NAVIGATION SYSTEM CONTROLLER FOR POWER MACHINE

CROSS-REFERENCE TO RELATED APPLICATION

This Application is a Section 371 National Stage Application of International Application No. PCT/US2020/031644, filed 6 May 2020, and published as WO 2020/227387 A1, on 12 Nov. 2020, in English, the contents of which are hereby incorporated by reference in their entirety.

BACKGROUND

This disclosure is directed toward power machines. More particularly, this disclosure is directed toward controlling power machines to operate autonomously in an environment where global positioning satellite signals are not available.

Power machines, for the purposes of this disclosure, include any type of machine that generates power to accomplish a particular task or a variety of tasks. One type of power machine is a work vehicle. Work vehicles are generally self-propelled vehicles that have a work device, such as a lift arm (although some work vehicles can have other work devices) that can be manipulated to perform a work function. Work vehicles include loaders, excavators, utility vehicles, tractors, and trenchers, to name a few examples.

Global positioning systems are systems of satellites, computers and receivers that utilize satellite transmitted signals to determine latitude and longitude of a receiver by calculating a time difference for signals from different satellites to reach the receiver. Global positioning systems and their receivers can be used in a wide variety of applications, including positioning of power machines. Because the satellite signals cannot penetrate some structures, global positioning systems typically cannot be used within buildings or in other areas where obstructions prevent a line of sight between the receiver and the satellites.

The discussion above is merely provided for general background information and is not intended to be used as an aid in determining the scope of the claimed subject matter.

SUMMARY

Disclosed are power machines and systems configured to provide autonomous or augmented control of the machines based on the location of the power machine and potential obstructions in a localized positioning environment where GPS navigation is not available.

Disclosed embodiments include power machines, such as loaders, and methods of providing augmented or autonomous control of power machines within localized positioning system environments where global positioning system signals are not available. A system of one or more controllers or computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a method (700) of providing augmented control of a power machine (100; 200; 300; 600), the method including: identifying (702) a localized positioning system environment (604) using a localization controller (614) in communication with a tag device (612) on the power machine; identifying (704) a current relative position of the power machine within the localized positioning system environment using the localization controller; identifying (706) a desired destination position (630) within the localized positioning system environment; identifying (708) obstacles (620; 622; 624) within the localized positioning system environment; creating (710) a power machine path (634) from the current relative position to the desired destination position based in part upon the identified obstacles; and using (712) an augmented operation controller (616) to at least partially autonomously control the power machine to drive along the created power machine path from the current relative position to the desired destination position. Other embodiments of this aspect include corresponding computer systems, apparatus, and computer programs recorded on one or more computer storage devices, each configured to perform the actions of the methods.

Implementations may include one or more of the following features. The method where identifying (702) the localized positioning system environment (604) further includes identifying whether the power machine has entered into, or is entering into, the localized positioning system environment and automatically stopping use of a global positioning system for navigation.

The method where identifying (706) the desired destination position (630) within the localized positioning system environment includes using at least one of the localization controller (614) and the augmented operation controller (616) to identify the desired destination position.

The method where identifying (706) the desired destination position (630) further includes receiving the desired destination position from a device located remotely from the power machine.

The method where identifying (708) the obstacles (620; 622; 624) within the localized positioning system environment further includes identifying the obstacles using an object sensor system (352; 652). The method where identifying the obstacles using the object sensor system (352; 652) includes identifying the obstacles using at least one of an image processing system with video sensors, a radar system, and a light detection and ranging system.

The method where identifying (708) the obstacles (620; 622; 624) within the localized positioning system environment further includes identifying the obstacles using a hand held computing device.

The method where identifying (704) the current relative position of the power machine within the localized positioning system environment using the localization controller further includes using a plurality of positioning devices (606; 608; 610) positioned within the localized positioning system environment to provide real-time location system position determination of the power machine.

One general aspect includes a power machine (100; 200; 300; 600) configured to operate with augmented control in a localized positioning system environment (604), the power machine including: a frame (110; 210); a power system (120; 220) supported by the frame; a traction system (140; 240) supported by the frame and powered by the power system to controllably propel the power machine over a support surface; a control system (160; 350) having a localization controller (614) configured to determine positioning of the power machine within the localized positioning system environment, an augmented operation controller (616) configured to provide augmented or at least partially autonomous control of the power machine, and a machine controller (618) configured to control the power system and the traction system responsive to the augmented operation controller, the control system configured to control the traction system to automatically guide the power machine in the localized positioning system environment, the control system further configured to: communicate between the localization controller (614) and a tag device (612) to identify presence of the power machine in the localized positioning system environment and to identify a current relative position of the power machine within the localized positioning system environment; identify a desired destination position (630) within the localized positioning system environment; identify obstacles (620; 622; 624) within the localized positioning system environment; create a power machine path (634) from the current relative position to the desired destination position based in part upon the identified obstacles; and use the augmented operation controller (616) and the machine controller (618) to at least partially autonomously control the power machine to drive along the created power machine path from the current relative position to the desired destination position.

Implementations may include one or more of the following features. The power machine and further including an object sensor system (352; 652) configured to detect the obstacles (620; 622; 624) within the localized positioning system environment and to communicate with the control system to aid in identifying the obstacles. The power machine where the object sensor system (352; 652) includes at least one of an image processing system with video sensors, a radar system, and a light detection and ranging system.

The power machine where the control system is further configured to determine whether the power machine has entered into, or is entering into, the localized positioning system environment and to automatically stop use of a global positioning system for navigation while in the localized positioning system environment.

The power machine where the control system is configured to identify the desired destination position of the power machine by receiving the desired destination position from a device located or positioned remotely from the power machine.

The power machine where the control system is configured to identify the obstacles within the localized positioning system environment using a hand held computing device in communication with the control system.

The power machine where the control system is further configured to identify the current relative position of the power machine within the localized positioning system environment using a plurality of positioning devices (606; 608; 610) positioned within the localized positioning system environment to provide real-time location system position determination of the power machine.

This Summary and the Abstract are provided to introduce a selection of concepts in a simplified form that are further described below in the Detailed Description. This Summary is not intended to identify key features or essential features of the claimed subject matter, nor are they intended to be used as an aid in determining the scope of the claimed subject matter.

DRAWINGS

FIG. 8 is an illustration of path finding, path generating and target updating algorithms.

DETAILED DESCRIPTION

Figure 1:
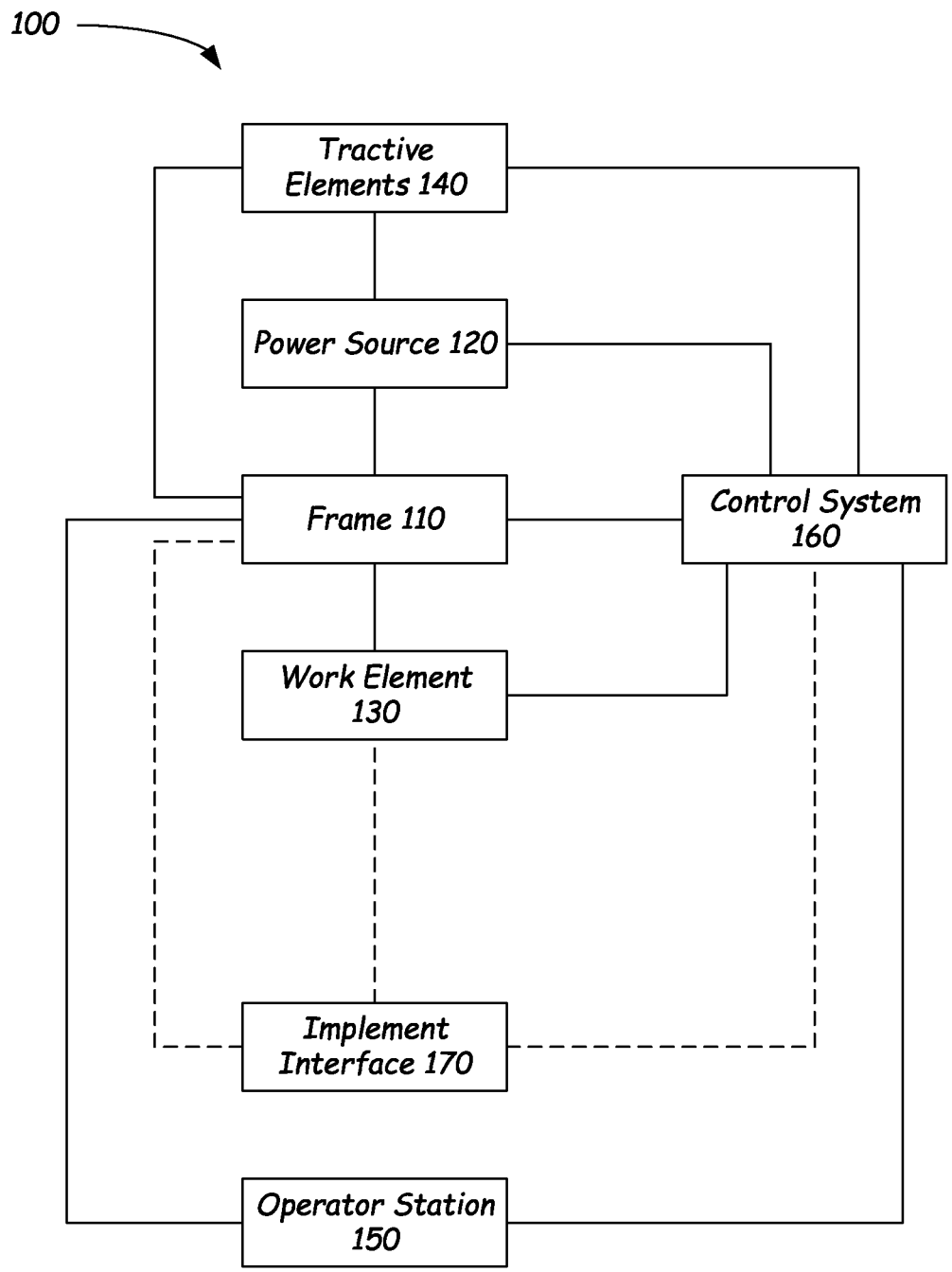
FIG. 1 is a block diagram illustrating functional systems of a representative power machine on which embodiments of the present disclosure can be advantageously practiced.

The concepts disclosed in this discussion are described and illustrated by referring to exemplary embodiments. These concepts, however, are not limited in their application to the details of construction and the arrangement of components in the illustrative embodiments and are capable of being practiced or being carried out in various other ways. The terminology in this document is used for the purpose of description and should not be regarded as limiting. Words such as "including," "comprising," and "having" and variations thereof as used herein are meant to encompass the items listed thereafter, equivalents thereof, as well as additional items.

Disclosed are power machine embodiments and methods of operation that utilize augmented operator control (AOC) systems to provide the power machines with numerous features, including: the ability to record global positioning system (GPS) or global navigational satellite system (GNSS) coordinates while a human operator is driving the vehicle; the ability to replay a pre-recorded path and automatically, or semi-automatically control the power machine to travel along the path; the ability to navigate according to a list of user-entered coordinates; and the ability to automatically travel around obstacles.

Some embodiments of AOC systems are based on Real-Time Kinematic (RTK) GPS or GNSS (hereafter referred to collectively as GPS) technology. For example, the system can include two GPS receivers: one immobile base station, and one receiver on the power machine. The base station is able to determine its position at sub-millimeter accuracy by collecting GPS data at a high frequency. Simultaneously, the base station sends correction data to the mobile receiver. By comparing this correction data with the telemetry from its own receiver, the power machine is able to determine its location at sub-centimeter accuracy. However, while an AOC system works outdoors in a GPS-enabled environment, it can be desirable to also utilize indoor localization technologies to enable autonomous system control of the power machines within GPS-denied environments as well.

A wide variety of localization techniques exists to localize indoor objects; and most of them utilize a set of stationary anchors (receivers, transmitters or transceivers) with known positions to localize a mobile tag (receiver, transmitter or transceiver). To position the tag, those systems utilize different techniques that consider the dynamics of signal transmission between the anchors and the tag. Among those techniques, time-difference-of-arrival (TDOA) and time-of-flight (TOF) are the most commonly used. TDOA uses the differences in signal arrival times between different anchors to a tag to obtain the angle of the tag relative to the anchors. TOF uses the signal propagation time to calculate distance between the anchors and the tag.

In addition to indoor localization technologies, perception of the surroundings is also utilized in some embodiments to make disclosed AOC system enabled power machines truly responsive to the changing environment. Sensors such as stereo cameras, Light Detection and Ranging (LiDAR), and radar are examples of the kinds of sensors that can be used. While extremely accurate, LiDAR sensor packages suffer high prices and maintenance costs. On the other hand, while stereo cameras are significantly less expensive than LiDAR, they require more complex algorithms to convert images to 3D models.

Figure 2:
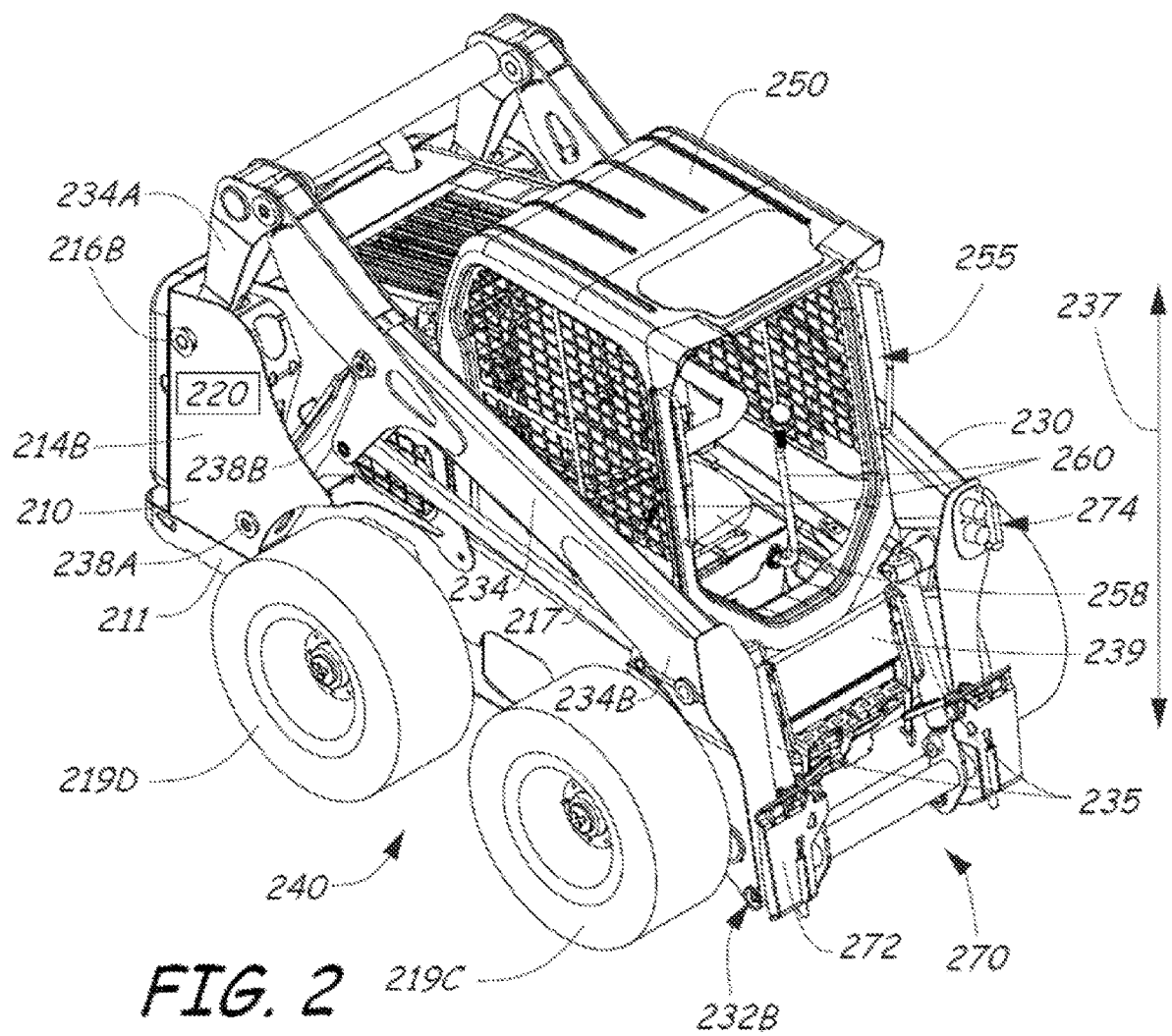
FIGS. 2-3 illustrate perspective views of a representative power machine in the form of a skid-steer loader of the type on which the disclosed embodiments can be practiced.
Figure 3:
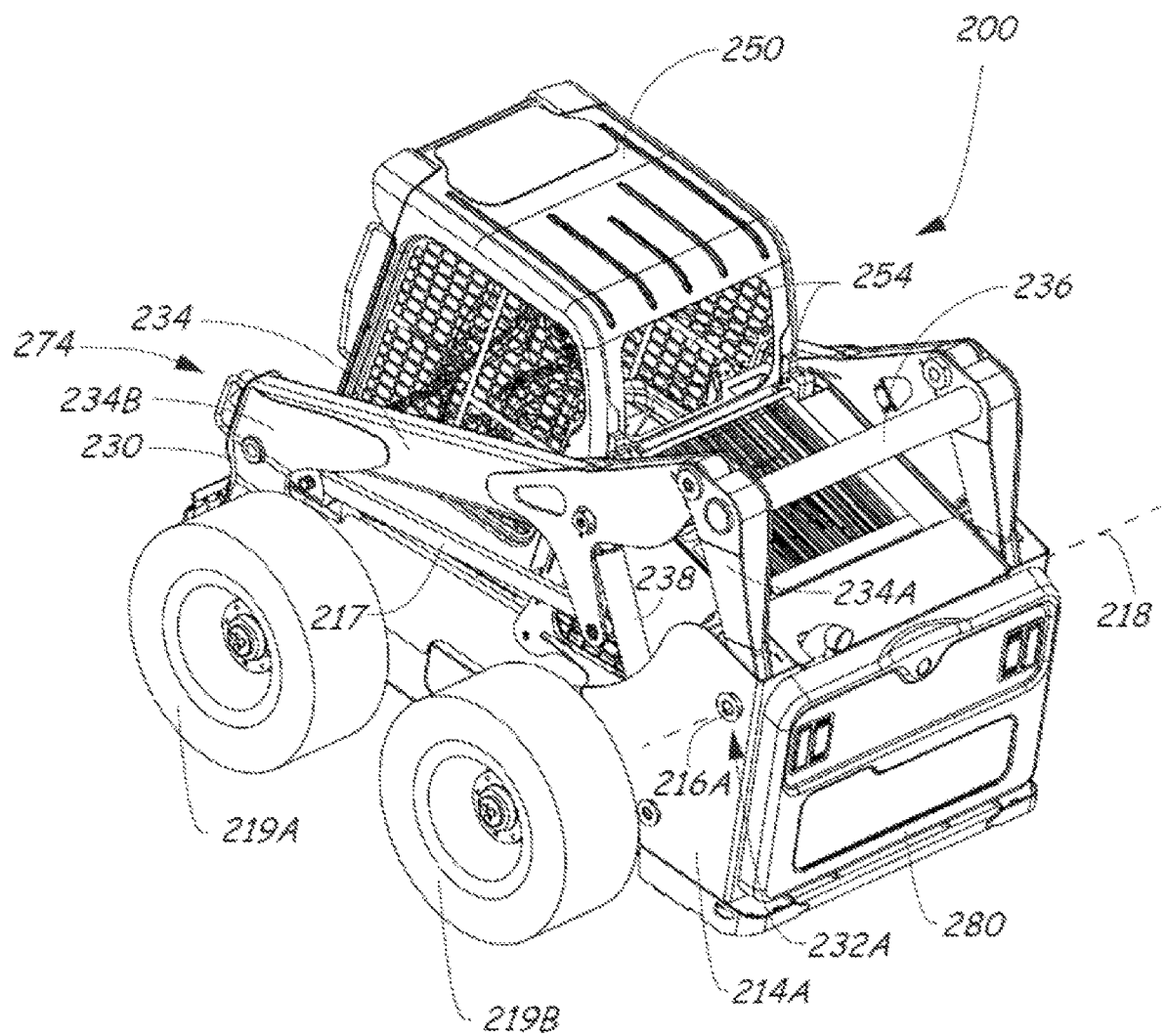

These concepts can be practiced on various power machines, as will be described below. A representative power machine on which the embodiments can be practiced is illustrated in diagram form in FIG. 1 and one example of such a power machine is illustrated in FIGS. 2-3 and described below before any embodiments are disclosed. For the sake of brevity, only one power machine is illustrated and discussed as being a representative power machine. However, as mentioned above, the embodiments below can be practiced on any of a number of power machines, including power machines of different types from the representative power machine shown in FIGS. 2-3. Power machines, for the purposes of this discussion, include a frame, at least one work element, and a power source that can provide power to the work element to accomplish a work task. One type of power machine is a self-propelled work vehicle. Self-propelled work vehicles are a class of power machines that include a frame, work element, and a power source that can provide power to the work element. At least one of the work elements is a motive system for moving the power machine under power.

FIG. 1 is a block diagram that illustrates the basic systems of a power machine 100, which can be any of a number of different types of power machines, upon which the embodiments discussed below can be advantageously incorporated. The block diagram of FIG. 1 identifies various systems on power machine 100 and the relationship between various components and systems. As mentioned above, at the most basic level, power machines for the purposes of this discussion include a frame, a power source, and a work element. The power machine 100 has a frame 110, a power source 120, and a work element 130. Because power machine 100 shown in FIG. 1 is a self-propelled work vehicle, it also has tractive elements 140, which are themselves work elements provided to move the power machine over a support surface and an operator station 150 that provides an operating position for controlling the work elements of the power machine. A control system 160 is provided to interact with the other systems to perform various work tasks at least in part in response to control signals provided by an operator.

Certain work vehicles have work elements that can perform a dedicated task. For example, some work vehicles have a lift arm to which an implement such as a bucket is attached such as by a pinning arrangement. The work element, i.e., the lift arm can be manipulated to position the implement to perform the task. The implement, in some instances can be positioned relative to the work element, such as by rotating a bucket relative to a lift arm, to further position the implement. Under normal operation of such a work vehicle, the bucket is intended to be attached and under use. Such work vehicles may be able to accept other implements by disassembling the implement/work element combination and reassembling another implement in place of the original bucket. Other work vehicles, however, are intended to be used with a wide variety of implements and have an implement interface such as implement interface 170 shown in FIG. 1. At its most basic, implement interface 170 is a connection mechanism between the frame 110 or a work element 130 and an implement, which can be as simple as a connection point for attaching an implement directly to the frame 110 or a work element 130 or more complex, as discussed below.

On some power machines, implement interface 170 can include an implement carrier, which is a physical structure movably attached to a work element. The implement carrier has engagement features and locking features to accept and secure any of a number of different implements to the work element. One characteristic of such an implement carrier is that once an implement is attached to it, it is fixed to the implement (i.e. not movable with respect to the implement) and when the implement carrier is moved with respect to the work element, the implement moves with the implement carrier. The term implement carrier as used herein is not merely a pivotal connection point, but rather a dedicated device specifically intended to accept and be secured to various different implements. The implement carrier itself is mountable to a work element 130 such as a lift arm or the frame 110. Implement interface 170 can also include one or more power sources for providing power to one or more work elements on an implement. Some power machines can have a plurality of work element with implement interfaces, each of which may, but need not, have an implement carrier for receiving implements. Some other power machines can have a work element with a plurality of implement interfaces so that a single work element can accept a plurality of implements simultaneously. Each of these implement interfaces can, but need not, have an implement carrier.

Frame 110 includes a physical structure that can support various other components that are attached thereto or positioned thereon. The frame 110 can include any number of individual components. Some power machines have frames that are rigid. That is, no part of the frame is movable with respect to another part of the frame. Other power machines have at least one portion that can move with respect to another portion of the frame. For example, excavators can have an upper frame portion that rotates with respect to a lower frame portion. Other work vehicles have articulated frames such that one portion of the frame pivots with respect to another portion for accomplishing steering functions.

Frame 110 supports the power source 120, which is configured to provide power to one or more work elements 130 including the one or more tractive elements 140, as well as, in some instances, providing power for use by an attached implement via implement interface 170. Power from the power source 120 can be provided directly to any of the work elements 130, tractive elements 140, and implement interfaces 170. Alternatively, power from the power source 120 can be provided to a control system 160, which in turn selectively provides power to the elements that capable of using it to perform a work function. Power sources for power machines typically include an engine such as an internal combustion engine and a power conversion system such as a mechanical transmission or a hydraulic system that is configured to convert the output from an engine into a form of power that is usable by a work element. Other types of power sources can be incorporated into power machines, including electrical sources or a combination of power sources, known generally as hybrid power sources.

FIG. 1 shows a single work element designated as work element 130, but various power machines can have any number of work elements. Work elements are typically attached to the frame of the power machine and movable with respect to the frame when performing a work task. In addition, tractive elements 140 are a special case of work element in that their work function is generally to move the power machine 100 over a support surface. Tractive elements 140 are shown separate from the work element 130 because many power machines have additional work elements besides tractive elements, although that is not always the case. Power machines can have any number of tractive elements, some or all of which can receive power from the power source 120 to propel the power machine 100. Tractive elements can be, for example, track assemblies, wheels attached to an axle, and the like. Tractive elements can be mounted to the frame such that movement of the tractive element is limited to rotation about an axle (so that steering is accomplished by a skidding action) or, alternatively, pivotally mounted to the frame to accomplish steering by pivoting the tractive element with respect to the frame.

Power machine 100 includes an operator station 150 that includes an operating position from which an operator can control operation of the power machine. In some power machines, the operator station 150 is defined by an enclosed or partially enclosed cab. Some power machines on which the disclosed embodiments may be practiced may not have a cab or an operator compartment of the type described above. For example, a walk behind loader may not have a cab or an operator compartment, but rather an operating position that serves as an operator station from which the power machine is properly operated. More broadly, power machines other than work vehicles may have operator stations that are not necessarily similar to the operating positions and operator compartments referenced above. Further, some power machines such as power machine 100 and others, whether or not they have operator compartments or operator positions, may be capable of being operated remotely (i.e. from a remotely located operator station) instead of or in addition to an operator station adjacent or on the power machine. This can include applications where at least some of the operator controlled functions of the power machine can be operated from an operating position associated with an implement that is coupled to the power machine. Alternatively, with some power machines, a remote-control device can be provided (i.e. remote from both of the power machine and any implement to which is it coupled) that is capable of controlling at least some of the operator controlled functions on the power machine.

FIGS. 2-3 illustrate a loader 200, which is one particular example of a power machine of the type illustrated in FIG. 1 where the embodiments discussed below can be advantageously employed. Loader 200 is a skid-steer loader, which is a loader that has tractive elements (in this case, four wheels) that are mounted to the frame of the loader via rigid axles. Here the phrase "rigid axles" refers to the fact that the skid-steer loader 200 does not have any tractive elements that can be rotated or steered to help the loader accomplish a turn. Instead, a skid-steer loader has a drive system that independently powers one or more tractive elements on each side of the loader so that by providing differing tractive signals to each side, the machine will tend to skid over a support surface. These varying signals can even include powering tractive element(s) on one side of the loader to move the loader in a forward direction and powering tractive element(s) on another side of the loader to mode the loader in a reverse direction so that the loader will turn about a radius centered within the footprint of the loader itself. The term "skid-steer" has traditionally referred to loaders that have skid steering as described above with wheels as tractive elements. However, it should be noted that many track loaders also accomplish turns via skidding and are technically skid-steer loaders, even though they do not have wheels. For the purposes of this discussion, unless noted otherwise, the term skid-steer should not be seen as limiting the scope of the discussion to those loaders with wheels as tractive elements.

Loader 200 is one particular example of the power machine 100 illustrated broadly in FIG. 1 and discussed above. To that end, features of loader 200 described below include reference numbers that are generally similar to those used in FIG. 1. For example, loader 200 is described as having a frame 210, just as power machine 100 has a frame 110. Skid-steer loader 200 is described herein to provide a reference for understanding one environment on which the embodiments described below related to track assemblies and mounting elements for mounting the track assemblies to a power machine may be practiced. The loader 200 should not be considered limiting especially as to the description of features that loader 200 may have described herein that are not essential to the disclosed embodiments and thus may or may not be included in power machines other than loader 200 upon which the embodiments disclosed below may be advantageously practiced. Unless specifically noted otherwise, embodiments disclosed below can be practiced on a variety of power machines, with the loader 200 being only one of those power machines. For example, some or all of the concepts discussed below can be practiced on many other types of work vehicles such as various other loaders, excavators, trenchers, and dozers, to name but a few examples.

Loader 200 includes frame 210 that supports a power system 220, the power system being capable of generating or otherwise providing power for operating various functions on the power machine. Power system 220 is shown in block diagram form, but is located within the frame 210. Frame 210 also supports a work element in the form of a lift arm assembly 230 that is powered by the power system 220 and that can perform various work tasks. As loader 200 is a work vehicle, frame 210 also supports a traction system 240, which is also powered by power system 220 and can propel the power machine over a support surface. The lift arm assembly 230 in turn supports an implement interface 270, which includes an implement carrier 272 that can receive and secure various implements to the loader 200 for performing various work tasks and power couplers 274, to which an implement can be coupled for selectively providing power to an implement that might be connected to the loader. Power couplers 274 can provide sources of hydraulic or electric power or both. The loader 200 includes a cab 250 that defines an operator station 255 from which an operator can manipulate various control devices 260 to cause the power machine to perform various work functions. Cab 250 can be pivoted back about an axis that extends through mounts 254 to provide access to power system components as needed for maintenance and repair.

The operator station 255 includes an operator seat 258 and a plurality of operation input devices, including control levers 260 that an operator can manipulate to control various machine functions. Operator input devices can include buttons, switches, levers, sliders, pedals and the like that can be stand-alone devices such as hand operated levers or foot pedals or incorporated into hand grips or display panels, including programmable input devices. Actuation of operator input devices can generate signals in the form of electrical signals, hydraulic signals, and/or mechanical signals. Signals generated in response to operator input devices are provided to various components on the power machine for controlling various functions on the power machine. Among the functions that are controlled via operator input devices on power machine 100 include control of the tractive elements 219, the lift arm assembly 230, the implement carrier 272, and providing signals to any implement that may be operably coupled to the implement.

Loaders can include human-machine interfaces including display devices that are provided in the cab 250 to give indications of information relatable to the operation of the power machines in a form that can be sensed by an operator, such as, for example audible and/or visual indications. Audible indications can be made in the form of buzzers, bells, and the like or via verbal communication. Visual indications can be made in the form of graphs, lights, icons, gauges, alphanumeric characters, and the like. Displays can be dedicated to providing dedicated indications, such as warning lights or gauges, or dynamic to provide programmable information, including programmable display devices such as monitors of various sizes and capabilities. Display devices can provide diagnostic information, troubleshooting information, instructional information, and various other types of information that assists an operator with operation of the power machine or an implement coupled to the power machine. Other information that may be useful for an operator can also be provided. Other power machines, such walk behind loaders may not have a cab nor an operator compartment, nor a seat. The operator position on such loaders is generally defined relative to a position where an operator is best suited to manipulate operator input devices.

Various power machines that can include and/or interacting with the embodiments discussed below can have various different frame components that support various work elements. The elements of frame 210 discussed herein are provided for illustrative purposes and frame 210 is not the only type of frame that a power machine on which the embodiments can be practiced can employ. Frame 210 of loader 200 includes an undercarriage or lower portion 211 of the frame and a mainframe or upper portion 212 of the frame that is supported by the undercarriage. The mainframe 212 of loader 200, in some embodiments is attached to the undercarriage 211 such as with fasteners or by welding the undercarriage to the mainframe. Alternatively, the mainframe and undercarriage can be integrally formed. Mainframe 212 includes a pair of upright portions 214A and 214B located on either side and toward the rear of the mainframe that support lift arm assembly 230 and to which the lift arm assembly 230 is pivotally attached. The lift arm assembly 230 is illustratively pinned to each of the upright portions 214A and 214B. The combination of mounting features on the upright portions 214A and 214B and the lift arm assembly 230 and mounting hardware (including pins used to pin the lift arm assembly to the mainframe 212) are collectively referred to as joints 216A and 216B (one is located on each of the upright portions 214) for the purposes of this discussion. Joints 216A and 216B are aligned along an axis 218 so that the lift arm assembly is capable of pivoting, as discussed below, with respect to the frame 210 about axis 218. Other power machines may not include upright portions on either side of the frame, or may not have a lift arm assembly that is mountable to upright portions on either side and toward the rear of the frame. For example, some power machines may have a single arm, mounted to a single side of the power machine or to a front or rear end of the power machine. Other machines can have a plurality of work elements, including a plurality of lift arms, each of which is mounted to the machine in its own configuration. Frame 210 also supports a pair of tractive elements in the form of wheels 219A-D on either side of the loader 200.

The lift arm assembly 230 shown in FIGS. 2-3 is one example of many different types of lift arm assemblies that can be attached to a power machine such as loader 200 or other power machines on which embodiments of the present discussion can be practiced. The lift arm assembly 230 is what is known as a vertical lift arm, meaning that the lift arm assembly 230 is moveable (i.e. the lift arm assembly can be raised and lowered) under control of the loader 200 with respect to the frame 210 along a lift path 237 that forms a generally vertical path. Other lift arm assemblies can have different geometries and can be coupled to the frame of a loader in various ways to provide lift paths that differ from the radial path of lift arm assembly 230. For example, some lift paths on other loaders provide a radial lift path. Other lift arm assemblies can have an extendable or telescoping portion. Other power machines can have a plurality of lift arm assemblies attached to their frames, with each lift arm assembly being independent of the other(s). Unless specifically stated otherwise, none of the inventive concepts set forth in this discussion are limited by the type or number of lift arm assemblies that are coupled to a particular power machine.

The lift arm assembly 230 has a pair of lift arms 234 that are disposed on opposing sides of the frame 210. A first end of each of the lift arms 234 is pivotally coupled to the power machine at joints 216 and a second end 232B of each of the lift arms is positioned forward of the frame 210 when in a lowered position as shown in FIG. 2. Joints 216 are located toward a rear of the loader 200 so that the lift arms extend along the sides of the frame 210. The lift path 237 is defined by the path of travel of the second end 232B of the lift arms 234 as the lift arm assembly 230 is moved between a minimum and maximum height.

Each of the lift arms 234 has a first portion 234A of each lift arm 234 is pivotally coupled to the frame 210 at one of the joints 216 and the second portion 234B extends from its connection to the first portion 234A to the second end 232B of the lift arm assembly 230. The lift arms 234 are each coupled to a cross member 236 that is attached to the first portions 234A. Cross member 236 provides increased structural stability to the lift arm assembly 230. A pair of actuators 238, which on loader 200 are hydraulic cylinders configured to receive pressurized fluid from power system 220, are pivotally coupled to both the frame 210 and the lift arms 234 at pivotable joints 238A and 238B, respectively, on either side of the loader 200. The actuators 238 are sometimes referred to individually and collectively as lift cylinders. Actuation (i.e., extension and retraction) of the actuators 238 cause the lift arm assembly 230 to pivot about joints 216 and thereby be raised and lowered along a fixed path illustrated by arrow 237. Each of a pair of control links 217 are pivotally mounted to the frame 210 and one of the lift arms 232 on either side of the frame 210. The control links 217 help to define the fixed lift path of the lift arm assembly 230.

Some lift arms, most notably lift arms on excavators but also possible on loaders, may have portions that are controllable to pivot with respect to another segment instead of moving in concert (i.e. along a pre-determined path) as is the case in the lift arm assembly 230 shown in FIG. 2. Some power machines have lift arm assemblies with a single lift arm, such as is known in excavators or even some loaders and other power machines. Other power machines can have a plurality of lift arm assemblies, each being independent of the other(s).

An implement interface 270 is provided proximal to a second end 232B of the lift arm assembly 234. The implement interface 270 includes an implement carrier 272 that is capable of accepting and securing a variety of different implements to the lift arm 230. Such implements have a complementary machine interface that is configured to be engaged with the implement carrier 272. The implement carrier 272 is pivotally mounted at the second end 232B of the arm 234. Implement carrier actuators 235 are operably coupled the lift arm assembly 230 and the implement carrier 272 and are operable to rotate the implement carrier with respect to the lift arm assembly. Implement carrier actuators 235 are illustratively hydraulic cylinders and often known as tilt cylinders.

By having an implement carrier capable of being attached to a plurality of different implements, changing from one implement to another can be accomplished with relative ease. For example, machines with implement carriers can provide an actuator between the implement carrier and the lift arm assembly, so that removing or attaching an implement does not involve removing or attaching an actuator from the implement or removing or attaching the implement from the lift arm assembly. The implement carrier 272 provides a mounting structure for easily attaching an implement to the lift arm (or other portion of a power machine) that a lift arm assembly without an implement carrier does not have.

Some power machines can have implements or implement like devices attached to it such as by being pinned to a lift arm with a tilt actuator also coupled directly to the implement or implement type structure. A common example of such an implement that is rotatably pinned to a lift arm is a bucket, with one or more tilt cylinders being attached to a bracket that is fixed directly onto the bucket such as by welding or with fasteners. Such a power machine does not have an implement carrier, but rather has a direct connection between a lift arm and an implement.

The implement interface 270 also includes an implement power source 274 available for connection to an implement on the lift arm assembly 230. The implement power source 274 includes pressurized hydraulic fluid port to which an implement can be removably coupled. The pressurized hydraulic fluid port selectively provides pressurized hydraulic fluid for powering one or more functions or actuators on an implement. The implement power source can also include an electrical power source for powering electrical actuators and/or an electronic controller on an implement. The implement power source 274 also exemplarily includes electrical conduits that are in communication with a data bus on the excavator 200 to allow communication between a controller on an implement and electronic devices on the loader 200.

Figure 4:
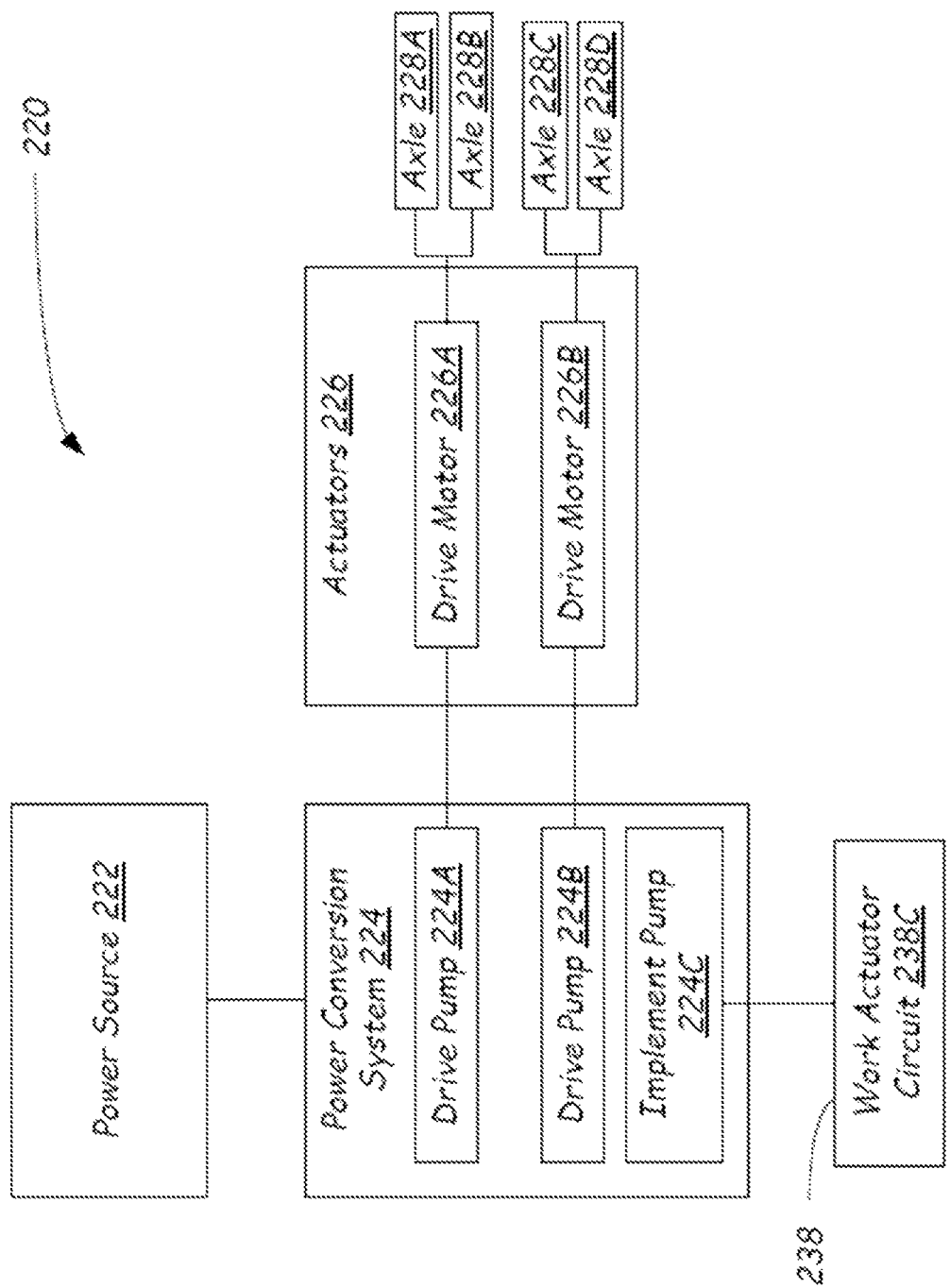
FIG. 4 is a block diagram illustrating components of a power system of a loader such as the loader illustrated in FIGS. 2-3.

Frame 210 supports and generally encloses the power system 220 so that the various components of the power system 220 are not visible in FIGS. 2-3. FIG. 4 includes, among other things, a diagram of various components of the power system 220. Power system 220 includes one or more power sources 222 that are capable of generating and/or storing power for use on various machine functions. On power machine 200, the power system 220 includes an internal combustion engine. Other power machines can include electric generators, rechargeable batteries, various other power sources or any combination of power sources that can provide power for given power machine components. The power system 220 also includes a power conversion system 224, which is operably coupled to the power source 222. Power conversion system 224 is, in turn, coupled to one or more actuators 226, which can perform a function on the power machine. Power conversion systems in various power machines can include various components, including mechanical transmissions, hydraulic systems, and the like. The power conversion system 224 of power machine 200 includes a pair of hydrostatic drive pumps 224A and 224B, which are selectively controllable to provide a power signal to drive motors 226A and 226B. The drive motors 226A and 226B in turn are each operably coupled to axles, with drive motor 226A being coupled to axles 228A and 228B and drive motor 226B being coupled to axles 228C and 228D. The axles 228A-D are in turn coupled to tractive elements 219A-D, respectively. The drive pumps 224A and 224B can be mechanically, hydraulic, and/or electrically coupled to operator input devices to receive actuation signals for controlling the drive pumps.

The arrangement of drive pumps, motors, and axles in power machine 200 is but one example of an arrangement of these components. As discussed above, power machine 200 is a skid-steer loader and thus tractive elements on each side of the power machine are controlled together via the output of a single hydraulic pump, either through a single drive motor as in power machine 200 or with individual drive motors. Various other configurations and combinations of hydraulic drive pumps and motors can be employed as may be advantageous.

The power conversion system 224 of power machine 200 also includes a hydraulic implement pump 224C, which is also operably coupled to the power source 222. The hydraulic implement pump 224C is operably coupled to work actuator circuit 238C. Work actuator circuit 238 includes lift cylinders 238 and tilt cylinders 235 as well as control logic to control actuation thereof. The control logic selectively allows, in response to operator inputs, for actuation of the lift cylinders and/or tilt cylinders. In some machines, the work actuator circuit also includes control logic to selectively provide a pressurized hydraulic fluid to an attached implement. The control logic of power machine 200 includes an open center, 3 spool valve in a series arrangement. The spools are arranged to give priority to the lift cylinders, then the tilt cylinders, and then pressurized fluid to an attached implement.

The description of power machine 100 and loader 200 above is provided for illustrative purposes, to provide illustrative environments on which the embodiments discussed below can be practiced. While the embodiments discussed can be practiced on a power machine such as is generally described by the power machine 100 shown in the block diagram of FIG. 1 and more particularly on a loader such as track loader 200, unless otherwise noted or recited, the concepts discussed below are not intended to be limited in their application to the environments specifically described above.

Figure 5:
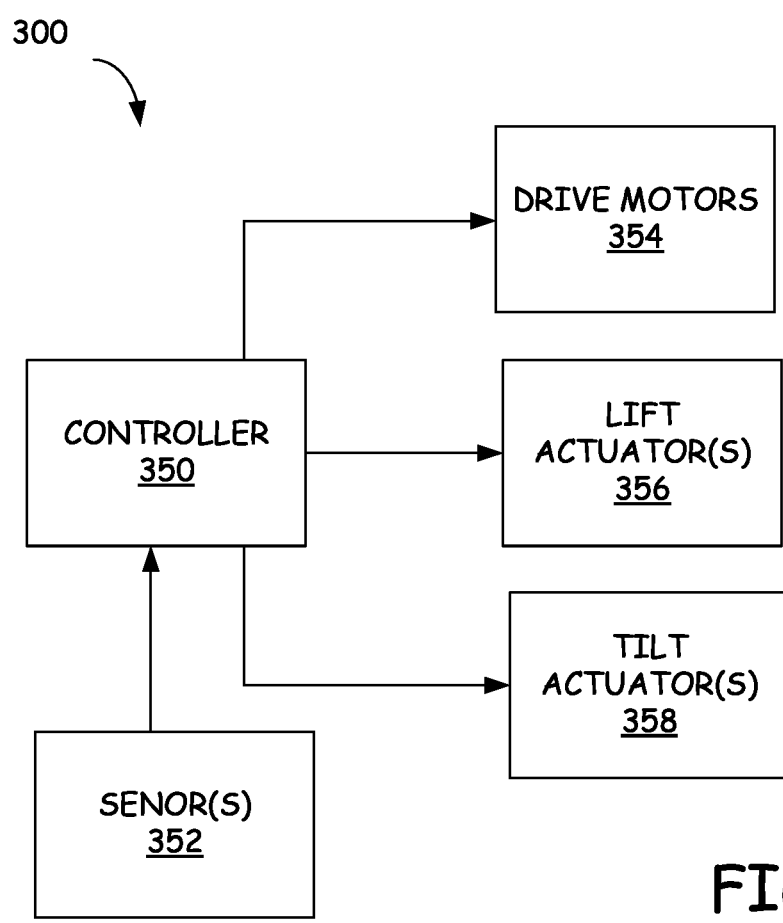
FIG. 5 is an illustration of components of a control system in one exemplary embodiment.

Referring now to FIG. 5, shown is a block diagram of portions of a power machine 300 that can be similar to the power machines discussed above. Power machine 300 has a control system 350, which can be implemented with multiple controllers as is described below, configured to guide the power machine in an augmented or automatic control mode, to travel along defined paths and/or perform defined functions. The augmented control can be used to aid an operator in performing work tasks with the power machine or can be used in some embodiments to automatically perform the tasks without the aid of the operator. As such, the control system or controller 350 controls drive motors 354 to control movement of the power machine relative to a support surface, controls lift actuator(s) 356 for raising and lowering a lift arm, and controls tilt actuator(s) 358 for rotating an implement carrier. In some illustrative embodiments, the control system 350 uses inputs from one or more sensors or sensor systems 452 in implementing augmented control to identify and avoid obstacles. For example, sensors or sensor systems such as a light detection and ranging (LIDAR) sensor system, a camera system such as a ZED stereo camera or other video systems with image recognition and processing, an RFID localization system, an infrared localization system, a 3D time of flight (ToF) Camera systems, etc. can be used.

In some embodiments, the control system 350 can be divided into four major components—a localization subsystem, an obstacle detection subsystem, a path planning subsystem, and a machine control subsystem. All of these systems are collectively represented in FIG. 5 as control system 350. Localization systems are used in disclosed embodiments to provide positioning information for augmented operator control of the power machine in environments where GPS satellite signals are not available such as, for example, in work areas which are inside of buildings or in the vicinity of other structures which prevent reliable reception of GPS signals.

In exemplary embodiments, a robotic operating system (ROS) is a robotics middleware that facilitates easy integration between hardware and software and provides a link for all of the four main subsystems of system 350. In a ROS-powered robotics system, specific functionality of the system is performed by minor programs called "nodes". Different nodes communicate with each other through a message publishing/subscribing system. The nodes can publish data or signals to a topic that other nodes can subscribe to. Similarly, nodes can also subscribe to any topic that other nodes publish to. A number of nodes can group together into a larger unit called a "package" that can perform larger functions. In exemplary disclosed embodiments, all of the aforementioned subsystems form individual packages that perform a specific role. For example, a path planning package includes a planner node that formulates a way point path around obstacles. It also includes a single target tracking node that converts the way points into command messages for the AOC controller to control (i.e. cause the power machine to be driven). The localization subsystem, obstacle detection subsystem, a path planning subsystem, and a machine control subsystem are discussed below in various degrees of additional detail with reference to the operational environment system block diagram shown in FIG. 6, with reference to the method flow chart shown in FIG. 7, and with reference to various design discussions which follow.

Figure 6:
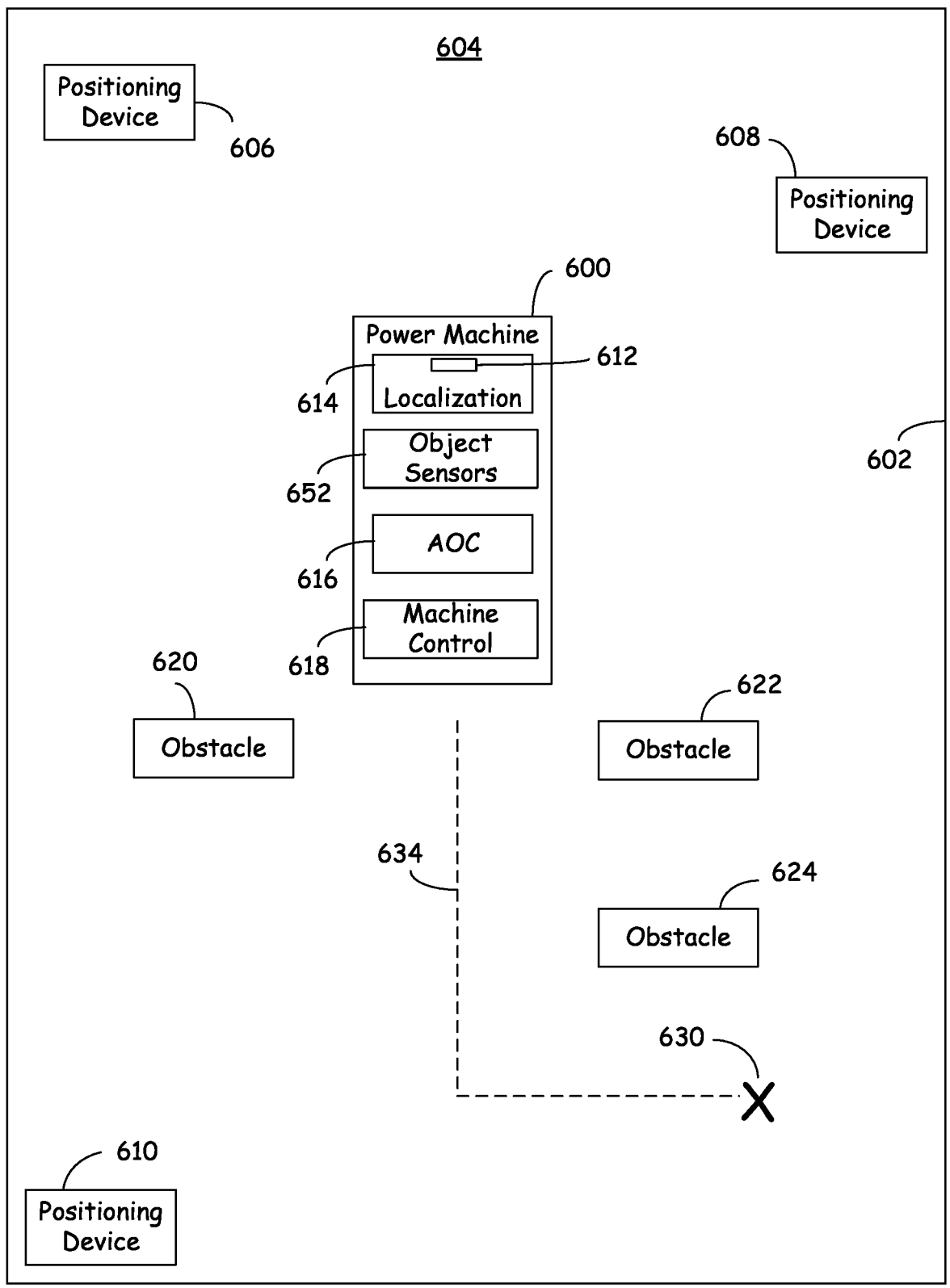
FIG. 6 is an illustration of a power machine configured to operate with augmented or autonomous control in a localized positioning system environment.

Referring now to FIG. 6, shown is a GPS-denied environment operating environment 602 such as a building or other work space where GPS signals are not reliably received from GPS system satellites. Formed within the environment 602 is a localized positioning system 604 including multiple positioning devices (devices 606, 608 and 610 are shown) used to aid in determining a position of a power machine 600. Devices 606-610 can be sensors, receivers, transmitters and/or transceivers positioned within or near the structure or operating environment and which transmit signals to, or receive signals from, power machine 600 to aid in determining a location of the power machine within the localized environment 602. The number of sensors can vary depending on the shape and size of a particular denied environment. In some exemplary embodiments, a Decawave® system using ultra-wideband (UWB) technology provides a real-time location systems (RTLS), though any RTLS technology can be used as desired for particular operating environments, power machine designs, etc. The Decawave RTLS uses a tag 612 (transmitter or transceiver), which can be positioned on the power machine 600 and configured to transmit messages on a periodic basis, and multiple positioning devices or anchors (receivers or transceivers) 606, 608 and 610 configured to receive the transmissions from the tag 612 and to timestamp the messages when received at the individual anchors. The position of the tag 612 can then be calculated from the times when the message is received at each of the multiple anchors using time difference of arrival techniques. The times of arrival can also be indicative of the distances calculated between the tag and each of the multiple anchors, allowing location of the tag to be determined using multiple distance indicative measurements.

In exemplary embodiments, power machine 600 includes multiple controller or control systems which work in conjunction with one another to provide augmented or autonomous operator control. A localization controller 614 either includes tag 612 or is in communication with the tag and is configured to determine a position of the power machine within the operating environment 602. The localization controller 614 provides position information to autonomous or augmented operation controller (AOC) 616, which is configured to implement augmented control methods to control the machine autonomously or semi-autonomously. The AOC 616 in turn interfaces with standard controllers 618 on the power machine to control machine travel or other functions such as lift, tilt, etc. In some embodiments, the localization controller 614 is also configured to utilize object detection sensors 652, such as discussed above with reference to sensors 352 shown in FIG. 5, to detect the position of objects or obstacles 620, 622 and 624. As discussed above, object detection sensors can be any suitable sensor or sensor system such as video sensors with image processing, radar, Light Detection and Ranging (LIDAR) sensors, etc. In other embodiments, however, the locations of objects or obstacles 620-624 are identified using other methods, such as being tagged using a hand-held computing device such as a cell phone or other similar device and stored in a database or map on power machine 600.

In some embodiments, the augmented operation controller 616 can also include global positioning system functionality to determine position of the power machine when satellite positioning signals are available. This allows power machine 600 to be used in both GPS-enabled and GPS-denied environments, and to transition between the environments as the power machine is moved from one to the other. In some situations, the power machine can be located such that both of the localized positioning environment and the GPS environment are accessible at the same time. In some embodiments, the localization controller is configured to utilize the localized environment as soon as available so that the transition between operating in the GPS-enabled environment and operating in the GPS-denied environment is as seamless as possible. In other embodiments, various schemes can be used to hand off between GPS and a localized positioning environment.

In some exemplary embodiments, the localization controller 614 is configured to determine the position of power machine 600 within environment 602, to identify a desired position 630 within the environment, and to identify the locations of obstacles 620-624. Localization controller 614 can then generate a path 634 and download that path to the AOC 616. The AOC then uses the generated path 634 to control machine travel functions via machine controllers 618. In other embodiments, the localization controller 614 determines power machine location, but the AOC 616 generates the path 634 itself and then controls the machine controllers to move the machine along that path. While the AOC, localization controller, and standard controllers are described as separate controllers, in some embodiments these controllers can be combined into a single controller or multiple controllers. While it is true that in some embodiments it can be advantageous to have the controllers in separate physical containers (e.g., in situations where the system can be added to an existing machine in the form of a kit), in other embodiments, it can be advantageous for all of the functions associated with the AOC, localization and standard controller integrated into a single controller assembly.

Figure 7:
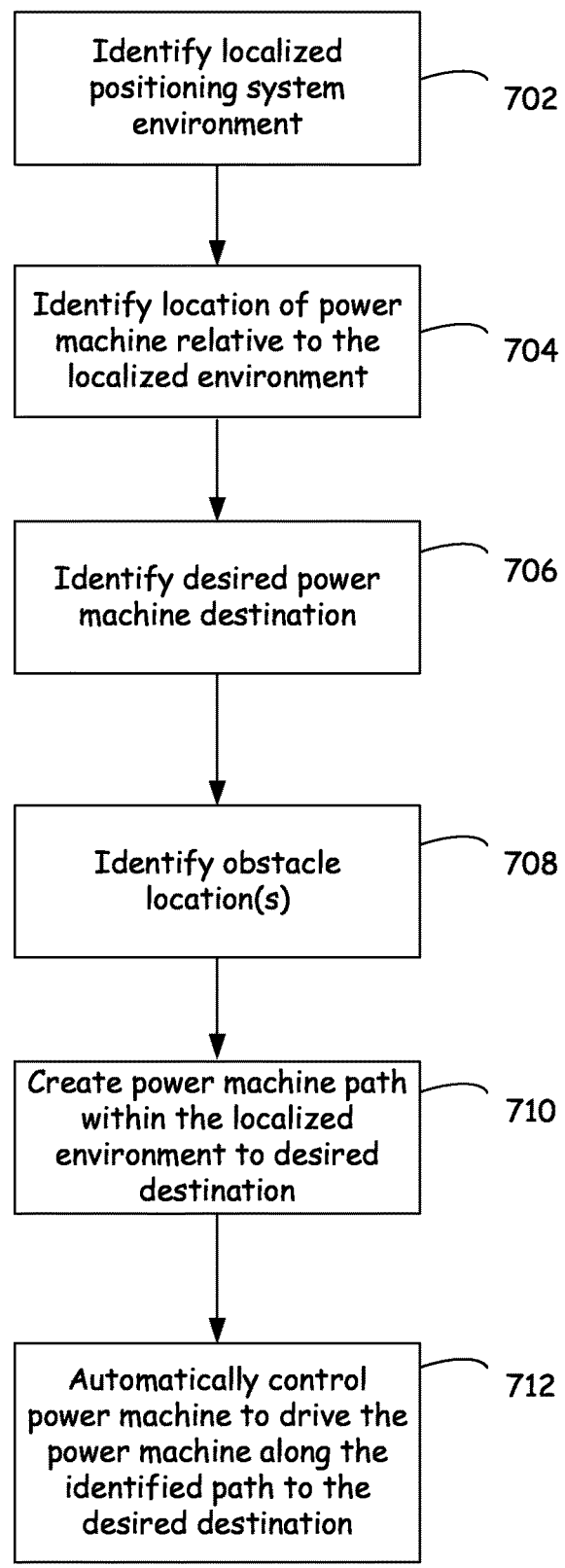
FIG. 7 is a flow diagram illustrating an exemplary method embodiment.

Referring now to FIG. 7, shown is a method 700 of providing autonomous or augmented control of a power machine. As shown at block 702, a localized positioning system environment 604 is identified. The power machine can begin operation within a building 602 using a localization environment 604, or the power machine can travel from outside in a GPS-enabled environment and transition into the localization environment. The controller 614 is configured to recognize that the power machine has entered into, or is entering into, a localized positioning environment and will automatically decide to use the localized positioning information and not the satellite positioning information. As discussed above, in some embodiments, when both satellite positioning signals and localized positioning signals are simultaneously available, the localized environment can be utilized as soon as possible so that the transition to a localized environment is seamless or as close to seamless as possible. At block 704, the relative location of the power machine is identified using the localized environment 604.

At block 706, the desired power machine destination (e.g., position 630) within localized environment is identified. Localization controller 614 or AOC 616 may already have the desired location information available, or the information may be provided once within the localized environment. In some embodiments, the desired destination can be communicated to one of the controllers by an external device located or positioned remotely from the power machine. For example, a hand held computing device, such as a smart phone or tablet computer, can be configured with an app to allow a user located remotely from the power machine to provide such information. In other embodiments, this information can be input by an operator of the power machine through an operator input device of the power machine.

At block 708, obstacles within the localized environment are identified, detected or located. This can be accomplished using object sensors or sensor systems 352, 652 as discussed above, or with an external or remote marking device such as a hand-held computing device. Once position of the power machine and location of obstacles within the localized environment are known, the localization controller 614 or the AOC 616 can be used to create a power machine path from a current power machine position to the desired position. This is shown at block 710. Then, as shown at block 712, the power machine is controlled to drive the power machine along the identified path to the desired destination. This control can be augmented control which assists an operator in performing this task, or can be completed automated control.

Localization Subsystem Design

Referring again to the localization system or subsystem 604, any of a number of different suitable system designs can be utilized. One such subsystem utilizes Decawave for providing position information for indoor GPS-denied localization. An extended Kalman filter (EKF) can then be used to fuse the Decawave range measurements into xy coordinates.

The problem of fusing the Decawave range measurements can be formulated as follows. Consider a tag in a 2D Cartesian plane with state s:

$$\vec{s} = [xy]^T$$

Consider n anchors in an environment with position $(x_1; y_1)$; $(x_2; y_2):::(x_n; y_n)$. The system of anchors will produce time-of-flight (TOF) range measurements of:

$$d_1^2 = (x_1 - x)^2 + (y_1 - y)^2$$
$$d_2^2 = (x_2 - x)^2 + (y_2 - y)^2$$
$$\vdots$$
$$d_n^2 = (x_n - x)^2 + (y_n - y)^2,$$

which can be generalized into the following, where $i=1:::n$ $$d_i = \sqrt{(x - x_i)^2 + (y - y_i)^2}$$

$$\vec{d} = \begin{bmatrix} d_1 \\ d_2 \\ \vdots \\ d_n \end{bmatrix}$$

$$\vec{d} = h(s, t).$$

In this example, range measurements of anchors $1:::n$ are used to determine the position $(x; y)$ of the tag.

The formula of a discrete time dynamic system with transition matrix A, control input B, noise matrix G, and inputs $u_t$ and noise Wt is:

$$s_{t+1} = A_t s_t + B_t u_t + G_t w_t$$

An exemplary implementation of the formula used the Brownian Motion Model, which assumes the agent to be in a static location. As there is no movement, the transition matrix A is:

$$A = \begin{bmatrix} 1 & 0 \\ 0 & 1 \end{bmatrix}, Q = \begin{bmatrix} 1000 & 0 \\ 0 & 1000 \end{bmatrix}, R = \begin{bmatrix} 100 & 0 \\ 0 & 100 \end{bmatrix}$$

Since there is no input, the u term can be removed. The process noise covariance Q will be considerably large since the target will be moving. Now consider the sensor measurement model with sensor transformation matrix H and measurement noise $v_t$:

$$d_t = H_t s_t + v_t$$

It is noted that the transformation for this case is nonlinear. As distance is related to state with the distance equation as in the time of flight equation solving for $d_n^2$ above, the equation can be linearized at the current state estimate and redefine H as $$H = \begin{bmatrix} \frac{x - x_1}{\sqrt{(x - x_1)^2 + (y - y_1)^2}} & \frac{y - y_1}{\sqrt{(x - x_1)^2 + (y - y_1)^2}} \\ \vdots & \vdots \\ \frac{x - x_i}{\sqrt{(x - x_i)^2 + (y - y_i)^2}} & \frac{y - y_1}{\sqrt{(x - x_i)^2 + (y - y_i)^2}} \end{bmatrix}$$

With the new transformation matrix H calculated at each iteration, this EKF can be used as the regular Kalman filter. A 3D case involving the height Z was implemented in this example.

To evaluate the precision of an example embodiment, an experiment was conducted to quantify the precision of the system within a rectangular area formed by four anchors. Three Decawave anchors were mounted on at a suitable height (for example, six to ten feet above the ground), and a fourth Decawave unit was used as the tag.

To provide an understanding of how positions of Decawave tags affect position measurement precision, 300 data points were taken at a total of 39 different sample locations. For each sample location, the mean x-coordinate and y-coordinate values were calculated. The root mean squared (RMS) distance values of the position measurements were also calculated. The RMS distances are defined as the following:

$$RMS = \sqrt{\frac{1}{n}\sum_i ((xi - \overline{x})^2 + (yi - \overline{y})^2)}.$$

where n is the number of data points taken, $x_i$ and $y_i$ are the x and y coordinates of each respective measurement, and $\overline{x}$ and $\overline{y}$ are the mean x and y coordinates of measurements. It was found that 94.9% of the RMS precision values were under 10 cm. The regions with higher than normal RMS distances were close to the edge of the rectangular region formed by the Decawave anchors. Thus, a Decawave localization system was found to work well for augmented power machine control operations.

Obstacle Avoidance Subsystem Design

The obstacle avoidance features of disclosed embodiments can be considered as a separate subsystem or can be integrated into localization or AOC controllers. One goal can be to navigate the loader in a known environment with unknown obstacles. In an example embodiment, a stereo camera can be used for sensing the environment. A 3D point cloud that the stereo camera creates can be compressed into a 2D costmap using a suitable compression algorithm. A costmap is the data structure that represents places that are safe for the automated power machine to operate in a grid of cells. Usually, the values in a costmap are binary, representing free space or places where the machine would be in collision. In exemplary embodiments, the costmap was then fed to a path planner algorithm to perform path planning.

Costmap Layers

A typical costmap contains three layers: A static layer that is based on a known map of the environment. An obstacle layer that marks the unknown obstacle in the environment, and an inflation layer that inflates the obstacle that accounts for the vehicle or power machine size.

To correctly place obstacles relative to the power machine, a costmap generator needs to know the relative position between the sensor (camera) and the vehicle itself. For example, the static environment reference frame that never changes is called map, the frame of the base of the vehicle is called base_link, and the camera frame is called zed_camera_center. At every instance, costmap generator needs to know where zed_camera_center is relative to the map frame, since all the point cloud data is captured from that reference frame. To provide this information, a broadcast node is provided to handle this transformation.

Path Planning Subsystem Design

Before a power machine can move from its current location to a preferred destination a path that the power machine should take to get to a destination, given a starting point and a map. An acceptable algorithm should use the basic depth-first search concept to give an optimal and complete solution, which means it will always find the shortest path between two points if there is, in fact an available path.

The generated cost map is viewed as a grid of nodes and with a starting node and a destination node have been identified on the map. The path planning algorithm then analyzes nodes around the starting node iteratively then moves adjacent nodes based on the evaluation repeatedly until the destination node was reached. The evaluation consists of two considerations. The first one is a cost of going from the starting node to the interest node. This travel cost increases as one moves further away from the starting node. The second consideration comes from a cost of going from the interest node to the destination node. This cost, often called heuristic, is only an estimate, and it can be estimated using the Euclidean distance. After reaching the destination node, one can backtrack and get the shortest path containing multiple nodes from the start to the destination. The pseudocode of the search algorithm can be found in FIG. 8.

Using the path generating algorithm, a path is acquired which basically is a list of nodes. The power machine controllers can then be instructed to follow a node on the path, one by one. Note that a target is the current node on the path list that power machine is trying to go to. The pseudocode for updating a target is shown in FIG. 8.

After the path planning node produces a route and current waypoint, the power machine must be driven and any error's in the machines trajectory towards the waypoint must be corrected. To accomplish this, a controller and corresponding ROS node can be implemented as described below.

ROS Implementation

In an exemplary embodiment, the controller is situated within a single ROS node, which subscribes to current heading, and current position, and current waypoint position. The controller publishes a signal for the path planner to replan. The node also pushes out USB serial messages to the AOC controller.

For a control law, a basic bang-bang controller was implemented with a dead band. Bang-bang control is a control law where the control effort switches between two states. In this example, the two states were left and right turning at a fixed speed. As mentioned above, the error is the difference in heading from a vector pointing from the power machine to the current way point. When the error is positive, the power machine is commanded to turn in one direction at a constant speed. When the error is negative, the power machine is commanded to turn the other direction at the same speed. In this example, the bang-bang control was modified by a dead band, effectively creating a third state. When the absolute value of the error is within some value, the power machine is commanded to simply move forward. Since the controller does not have gain parameters or recognize the magnitude of error beyond a deadband threshold, the machine will have fairly oscillatory behavior about the desired heading.

There are two primary ways a desired waypoint will change. The first is when the power machine is within a fixed distance of the current waypoint. Once the power machine reaching this threshold, the next waypoint from the path planner is assigned. The second way for a waypoint to be reassigned is in the event that the power machine, through controller inaccuracy, moves too far from the current waypoint. In an exemplary embodiment, a fixed threshold was set for a maximum distance from a waypoint. When the power machine is outside this distance, the path planner is triggered to make a new plan and assigns a waypoint within the threshold distance of the power machine.

Driving the Power Machine

To actually drive the vehicle, the control node pushes drive commands through USB serial communication to AOC. The AOC, in some embodiments, runs a script that converts the incoming serial drive commands into Controller Area Network (CAN) bus messages to start the power machine, and drive it in various directions.

Although the present invention has been described by referring preferred embodiments, workers skilled in the art will recognize that changes may be made in form and detail without departing from the scope of the discussion.

What is claimed is:

1. A method of providing augmented control of a power machine, the method comprising:
   identifying a localized positioning system environment using a localization controller in communication with a tag device on the power machine and automatically transitioning from use of a global positioning system for navigation to the localized positioning system;
   identifying a current relative position of the power machine within the localized positioning system environment using the localization controller;
   identifying a desired destination position within the localized positioning system environment;
   identifying obstacles within the localized positioning system environment;
   creating a power machine path from the current relative position to the desired destination position based in part upon the identified obstacles; and
   using an augmented operation controller to at least partially autonomously control the power machine to drive along the created power machine path from the current relative position to the desired destination position;
   wherein identifying the desired destination position within the localized positioning system environment comprises using at least one of the localization controller and the augmented operation controller.

2. The method of claim 1, wherein identifying the localized positioning system environment further comprises identifying whether the power machine has entered into, or is entering into, the localized positioning system environment and wherein automatically transitioning from use of the global positioning system for navigation to the localized positioning system comprises stopping use of the global positioning system for navigation.

3. The method of claim 1, wherein identifying the desired destination position further comprises receiving the desired destination position from a device located remotely from the power machine.

4. The method of claim 1, wherein identifying the obstacles within the localized positioning system environment further comprises identifying the obstacles using an object sensor system.

5. The method of claim 4, wherein identifying the obstacles using the object sensor system comprises identifying the obstacles using at least one of an image processing system with video sensors, a radar system, and a light detection and ranging system.

6. The method of claim 1, wherein identifying the obstacles within the localized positioning system environment further comprises identifying the obstacles using a hand held computing device.

7. The method of claim 1, wherein identifying the current relative position of the power machine within the localized positioning system environment using the localization controller further comprises using a plurality of positioning devices positioned within the localized positioning system environment to provide real-time location system position determination of the power machine.

8. A power machine configured to operate with augmented control in a localized positioning system environment, the power machine comprising:
   a frame;
   a power system supported by the frame;
   a traction system supported by the frame and powered by the power system to controllably propel the power machine over a support surface;
   a control system having a localization controller configured to determine positioning of the power machine within the localized positioning system environment, an augmented operation controller configured to provide augmented or at least partially autonomous control of the power machine, and a machine controller configured to control the power system and the traction system responsive to the augmented operation controller, the control system configured to control the traction system to automatically guide the power machine in the localized positioning system environment, the control system further configured to:
   communicate between the localization controller and a tag device to identify presence of the power machine in the localized positioning system environment and to identify a current relative position of the power machine within the localized positioning system environment;
   identify a desired destination position within the localized positioning system environment;
   identify obstacles within the localized positioning system environment;
   create a power machine path from the current relative position to the desired destination position based in part upon the identified obstacles; and
   use the augmented operation controller and the machine controller to at least partially autonomously control the power machine to drive along the created power machine path from the current relative position to the desired destination position.

9. The power machine of claim 8, and further comprising an object sensor system configured to detect the obstacles within the localized positioning system environment and to communicate with the control system to aid in identifying the obstacles.

10. The power machine of claim 9, wherein the object sensor system comprises at least one of an image processing system with video sensors, a radar system, and a light detection and ranging system.

11. The power machine of claim 8, wherein at least two of the localization controller, augmented operation controller, and the machine controller are integrated into a single controller.

12. The power machine of claim 8, wherein the control system is configured to identify the desired destination position of the power machine by receiving the desired destination position from a remote device.

13. The power machine of claim 8, wherein the control system is configured to identify the obstacles within the localized positioning system environment using a hand held computing device in communication with the control system.

14. The power machine of claim 8, wherein the control system is further configured to identify the current relative position of the power machine within the localized positioning system environment using a plurality of positioning devices positioned within the localized positioning system environment to provide real-time location system position determination of the power machine.

* * * * *